US010759893B2

(12) United States Patent
Loelsberg et al.

(10) Patent No.: US 10,759,893 B2
(45) Date of Patent: Sep. 1, 2020

(54) PROCESS FOR PRODUCING ISOCYANATE-BASED XEROGELS AND AEROGELS WITH MINERAL ACIDS

(71) Applicants: BASF SE, Ludwigshafen am Rhein (DE); THE CURATORS OF THE UNIVERSITY OF MISSOURI, Columbia, MO (US)

(72) Inventors: Wibke Loelsberg, Osnabrueck (DE); Marc Fricke, Osnabrueck (DE); Dirk Weinrich, Osnabrueck (DE); Nicholas Leventis, Rolla, MO (US); Chariklia Sotiriou-Leventis, Rolla, MO (US); Adnan M. Saeed, Rolla, MO (US)

(73) Assignees: BASF SE, Ludwigshafen am Rhein (DE); THE CURATORS OF THE UNIVERSITY OF MISSOURI, Columbia, MO (US)

( * ) Notice: Subject to any disclaimer, the term of this patent is extended or adjusted under 35 U.S.C. 154(b) by 320 days.

(21) Appl. No.: 15/767,710

(22) PCT Filed: Oct. 11, 2016

(86) PCT No.: PCT/EP2016/074308
§ 371 (c)(1),
(2) Date: Apr. 12, 2018

(87) PCT Pub. No.: WO2017/064044
PCT Pub. Date: Apr. 20, 2017

(65) Prior Publication Data
US 2018/0305491 A1    Oct. 25, 2018

Related U.S. Application Data

(60) Provisional application No. 62/242,324, filed on Oct. 16, 2015.

(30) Foreign Application Priority Data

Oct. 15, 2016 (EP) .................................. 15190183

(51) Int. Cl.
| C08G 18/10 | (2006.01) |
| C08J 9/28 | (2006.01) |
| C08G 18/08 | (2006.01) |
| C08G 18/76 | (2006.01) |
| C08G 18/70 | (2006.01) |
| C08K 3/24 | (2006.01) |
| C08G 101/00 | (2006.01) |

(52) U.S. Cl.
CPC ......... *C08G 18/14* (2013.01); *C08G 18/0852* (2013.01); *C08G 18/703* (2013.01); *C08G 18/7664* (2013.01); *C08K 3/24* (2013.01); *C08G 2101/0091* (2013.01)

(58) Field of Classification Search
CPC .. C08G 18/14; C08G 18/0852; C08G 18/703; C08G 2101/0091; C08K 3/24
See application file for complete search history.

(56) References Cited

U.S. PATENT DOCUMENTS

| 2009/0283480 A1* | 11/2009 | Schadler ................ B01D 39/18 210/767 |
| 2012/0152846 A1 | 6/2012 | Leventis et al. |
| 2012/0248125 A1* | 10/2012 | Fricke .................. B01J 13/0091 220/592.09 |

FOREIGN PATENT DOCUMENTS

| WO | WO 95/02009 A1 | 1/1995 |
| WO | WO 00/24799 A1 | 5/2000 |
| WO | WO 2009/027310 A1 | 3/2009 |
| WO | WO 2011/069959 A2 | 6/2011 |
| WO | WO 2012/000917 A1 | 1/2012 |
| WO | WO 2012/059388 A1 | 5/2012 |

OTHER PUBLICATIONS

International Search Report and Written Opinion dated Nov. 4, 2016, in PCT/EP2016/074308, filed Oct. 11, 2016.
International Preliminary Report on Patentability dated Feb. 23, 2018, in PCT/EP2016/074308, filed Oct. 11, 2016.
BASF, "Lupranat M 50 Technical Data Sheet", published 2014, http://www.catamold.de/cm/internet/en/function/conversions:/publish/content/Produkte/Isocyanates/lupranat_m_50.pdf, XP055402011, retrieved on Aug. 29, 2017, 3 pages.

* cited by examiner

*Primary Examiner* — Kara B Boyle
(74) *Attorney, Agent, or Firm* — Oblon, McClelland, Maier & Neustadt, L.L.P.

(57) ABSTRACT

The present invention is directed to a process for preparing a porous material, at least compris-ing the steps of providing a mixture (I) comprising a composition (A) at least comprising at least one polyfunctional isocyanate as component (ai) and at least one mineral acid (aa), and a sol-vent (B), reacting the components in the composition (A) obtaining an organic gel, and drying of the gel obtained. The invention further relates to the porous materials which can be obtained in this way and the use of the porous materials as thermal insulation material and as catalysts.

10 Claims, No Drawings

PROCESS FOR PRODUCING ISOCYANATE-BASED XEROGELS AND AEROGELS WITH MINERAL ACIDS

The present invention is directed to a process for preparing a porous material, at least comprising the steps of providing a mixture (I) comprising a composition (A) at least comprising at least one polyfunctional isocyanate as component (ai) and at least one mineral acid (aa), and a solvent (B), reacting the components in the composition (A) obtaining an organic gel, and drying of the gel obtained. The invention further relates to the porous materials which can be obtained in this way and the use of the porous materials as thermal insulation material and as catalysts.

Porous materials, for example polymer foams, having pores in the size range of a few microns or significantly below and a high porosity of at least 70% are particularly good thermal insulators on the basis of theoretical considerations.

Such porous materials having a small average pore diameter can be, for example, in the form of organic aerogels or xerogels which are produced with a sol-gel process and subsequent drying. In the sol-gel process, a sol based on a reactive organic gel precursor is first produced and the sol is then gelled by means of a crosslinking reaction to form a gel. To obtain a porous material, for example an aerogel, from the gel, the liquid has to be removed. This step will hereinafter be referred to as drying in the interests of simplicity.

WO 95/02009 discloses isocyanate-based xerogels which are particularly suitable for applications in the field of vacuum insulation. The publication also discloses a sol-gel-based process for producing the xerogels, in which known, inter alia aromatic, polyisocyanates and an unreactive solvent are used. As further compounds having active hydrogen atoms, use is made of aliphatic or aromatic polyamines or polyols. The examples disclosed in the publication comprise ones in which a polyisocyanate is reacted with diaminodiethyltoluene. The xerogels disclosed generally have average pore sizes in the region of 50 μm. In one example, mention is made of an average pore diameter of 10 μm.

WO 2011/069959, WO 2012/000917 and WO 2012/059388 describe porous materials based on polyfunctional isocyanates and polyfunctional aromatic amines, where the amine component comprises polyfunctional substituted aromatic amines. The porous materials described are produced by reacting isocyanates with the desired amount of amine in a solvent which is inert toward the isocyanates. The use of catalysts is known from WO 2012/000917 and WO 2012/059388.

US 2012/152846 A1 discloses porous three-dimensional networks of polyurea and porous three-dimensional networks of carbon and methods of their manufacture. According to an example, polyurea aerogels are prepared by mixing an triisocyanate with water and a triethylamine to form a sol-gel material and supercritically drying the sol-gel material to form the polyurea aerogel. Subjecting the polyurea aerogel to a step of pyrolysis may result in a three dimensional network having a carbon skeleton, yielding a carbon aerogel. The density and morphology of polyurea aerogels can be controlled by varying the amount of isocyanate monomer in the initial reaction mixture.

However, the materials properties, in particular the mechanical stability and/or the compressive strength and also the thermal conductivity, of the known porous materials based on polyurea are not satisfactory for all applications.

A particular problem associated with the formulations based on isocyanates and amines which are known from the prior art are mixing defects. Mixing defects occur as a result of the high reaction rate between isocyanates and amino groups, since the gelling reaction has already proceeded a long way before complete mixing. Mixing defects lead to porous materials having heterogeneous and unsatisfactory materials properties.

Another disadvantage of known porous materials often is the high costs of the starting materials.

It was therefore an object of the invention to avoid the abovementioned disadvantages. In particular, a porous material which does not have the abovementioned disadvantages, or has them to a reduced extent, should be provided. The porous materials should have a low thermal conductivity in the ventilated state, i.e. at atmospheric pressure. Furthermore, the porous material should at the same time have a high porosity, a low density and a sufficiently high mechanical stability. Additionally, the porous material should be produced from less cost intensive starting materials.

According to the present invention, this object is solved by a process for preparing a porous material, at least comprising the steps of:

a) providing a mixture (I) comprising
(i) a composition (A) at least comprising
at least one polyfunctional isocyanate as component (ai) and
at least one mineral acid (aa) and
(ii) a solvent (B),
b) reacting the components in the composition (A) obtaining an organic gel, and
c) drying of the gel obtained.

The porous materials of the present invention are preferably aerogels or xerogels. For the purposes of the present invention, a xerogel is a porous material which has been produced by a sol-gel process in which the liquid phase has been removed from the gel by drying below the critical temperature and below the critical pressure of the liquid phase ("subcritical conditions"). An aerogel is a porous material which has been produced by a sol-gel process in which the liquid phase has been removed from the gel under supercritical conditions.

It has surprisingly been found that according to the process of the present invention polyurea based aerogels are obtained by a process free of significant amounts of water and/or amines.

Preferred embodiments may be found in the claims and the description. Combinations of preferred embodiments do not go outside the scope of the present invention. Preferred embodiments of the components used are described below.

According to the present invention, in the process for preparing a porous material a mixture (I) comprising a composition (A) and a solvent (B) is provided in step a). Composition (A) comprises at least one polyfunctional isocyanate as component (ai) and at least one mineral acid (aa). According to step b) the components in composition (A) are reacted in the presence of the solvent (B) to form a gel. The gel is then dried according to step c) of the process of the present invention.

The process as disclosed above results in porous materials with improved properties.

The composition (A) comprises at least one polyfunctional isocyanate as component (ai) and at least one mineral acid (aa). Composition (A) can also comprise further components. In the context of the present invention it is possible, that composition (A) comprises no further components, i.e. according to one embodiment of the present invention, composition (A) consists of one or more polyfunctional isocyanates as component (ai) and one or more mineral acids (aa).

It has been found advantageous that composition (A) comprises only low amounts of amines, alcohols and water. According to the present invention, composition (A) preferably comprises amines in an amount in the range of from 0 to 2 wt.-%, in particular in an amount in the range of from 0 to 1 wt.-%, more preferably in an amount in the range of from 0.1 to 0.5 wt.-%. Furthermore, according to the present invention, composition (A) preferably comprises alcohols in an amount in the range of from 0 to 20 wt.-%, in particular in an amount in the range of from 0 to 10 wt.-%, more preferably in an amount in the range of from 0.1 to 5 wt.-%. Composition (A) preferably comprises water in an amount in the range of from 0 to 1 wt.-%, in particular in an amount in the range of from 0 to 0.5 wt.-%, more preferably in an amount in the range of from 0.1 to 0.2 wt.-%.

According to a further embodiment, the present invention is directed to the process for preparing a porous material as disclosed above, wherein composition (A) comprises
amines in an amount in the range of from 0 to 2 wt.-%,
alcohols in an amount in the range of from 0 to 20 wt.-% and
water in an amount in the range of from 0 to 1 wt.-%.

In a particularly preferred embodiment, water is not used. According to a further embodiment, the present invention is directed to the process for preparing a porous material as disclosed above, wherein no water is used.

Composition (A) comprises at least one mineral acid (aa). In principle, any mineral acid can be used in the context of the present invention. It is also possible according to the present invention that the composition (A) comprises two or more mineral acids.

In the context of the present invention, a mineral acid is an acid which does not comprise carbon. Suitable in the context of the present invention are for example of mineral oxo-acids comprising sulphur, boron, nitrogen, phosphorus, silicon, chlorine, bromine, iodine or fluorine, chromium, vanadium, manganese, rhenium, technetium, arsenic, selenium or tellurium.

According to a further embodiment, the present invention is directed to the process for preparing a porous material as disclosed above, wherein the mineral acid (aa) is selected from the group consisting of mineral oxo-acids comprising sulphur, boron, nitrogen, phosphorus, silicon, chlorine, bromine, iodine or fluorine, chromium, vanadium, manganese, rhenium, technetium, arsenic, selenium or tellurium.

The mineral acid (aa) may for example be selected from the group consisting of $HNO_2$, $HNO_3$, $H_2P_2O_6$, $H_3PO_2$, $H_3PO_3$, $H_3PO_4$, $H_4P_2O_7$, $H_4P_3O_{10}$, $H_2SO_4$, $H_2SO_5$, $H_2S_2O_8$, $H_2S_2O_6$, $H_2S_2O_3$, $H_3BO_3$, $H_2CrO_4$, $H_2Cr_2O_7$, $H_3VO_4$, $HMnO_3$, $HTcO_4$, $HTcO_3$, $HReO_4$, $HReO_3$, $H_4SiO_4$, $HOCN$, $HNCO$, $HONC$, $H_2N_2O_2$, $HPO_3$, $H_3PO_5$, $H_2P_2H_2O_5$, $HPH_2O_2$, $H_3AsO_4$, $H_3AsO_3$, $H_2SO_3$, $H_2S_2O_7$, $H_2S_2O_5$, $H_2S_2O_2$, $H_2SO_2$, $H_2SeO_4$, $H_2SeO_3$, $H_2TeO_4$, $H_6TeO_6$, $H_2TeO_3$, $HClO_4$, $HClO_3$, $HClO_2$, $HClO$, $HBrO_4$, $HBrO_3$, $HBrO_2$, $HBrO$, $H_1O_4$, $H_5IO_6$, $HIO_3$, $HIO$. The mineral acid (aa) may for example also be selected from the group consisting of heteropoly acids and isopoly acids such as dodecamolybdato phosphoric acid, triammonium-dodecamolybdato phoshoric acid, and dodecatungstophosphoric acid.

According to a further embodiment, the present invention is directed to the process for preparing a porous material as disclosed above, wherein the mineral acid (aa) is selected from the group consisting of $HNO_2$, $HNO_3$, $H_2P_2O_6$, $H_3PO_2$, $H_3PO_3$, $H_3PO_4$, $H_4P_2O_7$, $H_4P_3O_{10}$, $H_2SO_4$, $H_2SO_5$, $H_2S_2O_8$, $H_2S_2O_6$, $H_2S_2O_3$, $H_3BO_3$, $H_2CrO_4$, $H_2Cr_2O_7$, $H_3VO_4$, $HMnO_3$, $HTcO_4$, $HTcO_3$, $HReO_4$, $HReO_3$, $H_4SiO_4$, $HOCN$, $HNCO$, $HONC$, $H_2N_2O_2$, $HPO_3$, $H_3PO_5$, $H_2P_2H_2O_5$, $HPH_2O_2$, $H_3AsO_4$, $H_3AsO_3$, $H_2SO_3$, $H_2S_2O_7$, $H_2S_2O_5$, $H_2S_2O_2$, $H_2SO_2$, $H_2SeO_4$, $H_2SeO_3$, $H_2TeO_4$, $H_6TeO_6$, $H_2TeO_3$, $HClO_4$, $HClO_3$, $HClO_2$, $HClO$, $HBrO_4$, $HBrO_3$, $HBrO_2$, $HBrO$, $HIO_4$, $H_5IO_6$, $HIO_3$, $HIO$.

According to a further embodiment, the present invention is directed to the process for preparing a porous material as disclosed above, wherein the mineral acid (aa) is selected from the group consisting of heteropoly acids and isopoly acids, in particular wherein the mineral acid (aa) is selected from the group consisting of dodecamolybdato phosphoric acid, triammoniumdodecamolybdato phoshoric acid, and dodecatungstophosphoric acid.

It has been found advantageous to use a mineral acid which is soluble in the solvents used in the process according to the present invention. However, it is also possible to use a mineral acid which is not completely soluble in the solvents which are used during the final stages of the process of the present invention. In this case, the mineral acid can be used to dote the porous material obtained in the process.

Generally, the amount of the mineral acid (aa) and the component (ai) used can vary in broad ranges. According to the present invention, the mineral acid preferably is used in an amount in the range of from 60 to 1 mol %, preferably in an amount in the range of from 57 to 5 mol %, more preferable an amount in the range of from 54 to 20 mol %.

According to a further embodiment, the present invention is directed to the process for preparing a porous material as disclosed above, wherein composition (A) comprises the mineral acid (aa) in an amount in the range of from 60 to 1 mol %.

According to the present invention, composition (A) further comprises at least one polyfunctional isocyanate as component (ai).

The polyfunctional isocyanates (ai) will hereinafter be referred to collectively as component (ai). It will be obvious to a person skilled in the art that the monomer components mentioned are present in reacted form in the porous material. For the purposes of the present invention, the functionality of a compound is the number of reactive groups per molecule. In the case of the monomer component (ai), the functionality is the number of isocyanate groups per molecule. A polyfunctional compound has a functionality of at least 2.

If mixtures of compounds having different functionalities are used as component (ai), the functionality of the components is in each case given by the number average of the functionality of the individual compounds. A polyfunctional compound comprises at least two of the abovementioned functional groups per molecule.

Preferably the amount of component (ai) used is in the range of from 40 to 99 mol %, in particular in the range of from 50 to 95 mol %, more preferable in the range of from 60 to 90 mol %, particularly preferably in the range of from 70 to 85 mol %.

According to a further embodiment, the present invention is directed to the process for preparing a porous material as disclosed above, wherein composition (A) comprises component (ai) in an amount in the range of from 40 to 99 mol %.

Possible polyfunctional isocyanates are aromatic, aliphatic, cycloaliphatic and/or araliphatic isocyanates. Such polyfunctional isocyanates are known per se or can be prepared by methods known per se. The polyfunctional isocyanates can also be used, in particular, as mixtures, so that the component (ai) in this case comprises various polyfunctional isocyanates. Polyfunctional isocyanates which are possible as monomer building blocks (ai) have two (hereinafter referred to as diisocyanates) or more than two isocyanate groups per molecule of the monomer component.

According to a further embodiment, the present invention is directed to the process for preparing a porous material as disclosed above, wherein the polyfunctional isocyanate is selected from the group consisting of aromatic, aliphatic, cycloaliphatic and araliphatic isocyanates.

Particularly suitable polyfunctional isocyanates are diphenylmethane 2,2'-, 2,4'- and/or 4,4'-diisocyanate (MDI), naphthylene 1,5-diisocyanate (NDI), tolylene 2,4- and/or 2,6-diisocyanate (TDI), 3,3'-dimethylbiphenyl diisocyanate, 1,2-diphenylethane diisocyanate and/or p-phenylene diisocyanate (PPDI), 2-isocyanatoethylmethacrylate (IEM), 1,3-bis(1-isocyanato-1methylethyl)benzene (TMXDI), 1-(isocyanato-1-methylethyl)-3-(1-methyl-1-ethypenzene) (TMI), 1,4-bis(isocyanato-methyl)-benzene (XDI), trimethylene, tetramethylene, pentamethylene, hexamethylene, hep-tamethylene and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), 1,6-diisocyanatohexane (HDI), bis(4-isocyanatocyclohexyl)methane ($H_{12}$MDI), cyclohexane 1,4-diisocyanate, 1-methylcyclohexane 2,4- and/or 2, 6-diisocyanate and dicyclohexylmethane 4,4'-, 2,4'- and/or 2,2'-diisocyanate, tris(4-isocyanatophenyl)methane (TIPM).

As polyfunctional isocyanates (ai), preference is given to aromatic isocyanates. Particularly preferred polyfunctional isocyanates of the component (ai) are the following embodiments:
  i) polyfunctional isocyanates based on tolylene diisocyanate (TDI), in particular 2, 4-TDI or 2,6-TDI or mixtures of 2,4- and 2,6-TDI;
  ii) polyfunctional isocyanates based on diphenylmethane diisocyanate (MDI), in particular 2,2'-MDI or 2,4'-MDI or 4,4'-MDI or oligomeric MDI, also referred to as polyphenylpolymethylene isocyanate, or mixtures of two or three of the abovementioned diphenylmethane diisocyanates or crude MDI which is obtained in the production of MDI or mixtures of at least one oligomer of MDI and at least one of the abovementioned low molecular weight MDI derivatives;
  iii) tris(4-isocyanatophenyl)methane (TIPM);
  iv) mixtures of at least one aromatic isocyanate according to embodiment i) and at least one aromatic isocyanate according to embodiment ii).

According to a further embodiment, the present invention is directed to the process for preparing a porous material as disclosed above, wherein an isocyanate mixture is used as component (ai).

Oligomeric diphenylmethane diisocyanate is particularly preferred as polyfunctional isocyanate. Oligomeric diphenylmethane diisocyanate (hereinafter referred to as oligomeric MDI) is an oligomeric condensation product or a mixture of a plurality of oligomeric condensation products and thus a derivative/derivatives of diphenylmethane diisocyanate (MDI). The polyfunctional isocyanates can preferably also be made up of mixtures of monomeric aromatic diisocyanates and oligomeric MDI.

According to a further embodiment, the present invention is directed to the process for preparing a porous material as disclosed above, wherein the polyfunctional isocyanate is a mixture of monomeric aromatic diisocyanates and oligomeric MDI. In case a mixture of polymeric and monomeric MDI is used, the amount of polymeric MDI in the mixture for example is in the range of from 100% to 30%, preferably in the range of from 95% to 40%, more preferably in the range of from 90% to 45%. The amount of monomeric MDI is for example in the range of from 60% to 0%, preferably in the range of from 55% to 10%, more preferably in the range of from 50% to 15%, in each case based on the sum of polymeric and monomeric MDI.

Suitable mixtures of isomers of MDI comprise for example 2,4-MDI and 4,4'-MDI. The total proportion by weight of 2,4-MDI based on the total weight of the mixture comprising composition 2,4-MDI and 4,4'-MDI, which is 100% by weight, is preferably from 0 to 56% by weight, in particular from 0.4 to 54% by weight, more preferably from 0.8 to 52% by weight, particularly preferably from 1.2 to 50% by weight. Adherence to the amount of isomers in the starting materials in the range mentioned leads to porous materials having a particularly advantageous pore structure, low thermal conductivity and low shrinking during drying. Oligomeric MDI comprises one or more condensation products of MDI which have a plurality of rings and a functionality of more than 2, in particular 3 or 4 or 5. Oligomeric MDI is known and is frequently referred to as polyphenylpolymethylene isocyanate or as polymeric MDI. Oligomeric MDI is usually made up of a mixture of MDI-based isocyanates having various functionalities. Oligomeric MDI is usually used in admixture with monomeric MDI.

The (average) functionality of an isocyanate comprising oligomeric MDI can vary in the range from about 2.2 to about 5, in particular from 2.3 to 3.5, in particular from 2.4 to 3. Such a mixture of MDI-based polyfunctional isocyanates having various functionalities is, in particular, crude MDI which is obtained in the production of MDI.

Polyfunctional isocyanates or mixtures of a plurality of polyfunctional isocyanates based on MDI are known and are marketed, for example, by BASF Polyurethanes GmbH under the name Lupranat®.

The functionality of the component (ai) is preferably at least two, in particular at least 2.2 and particularly preferably at least 2.4. The functionality of the component (ai) is preferably from 2.2 to 4 and particularly preferably from 2.4 to 3.

In a preferred embodiment, the component (ai) comprises at least one polyfunctional isocyanate selected from among diphenylmethane 4,4'-diisocyanate, diphenylmethane 2,4'-diisocyanate, diphenylmethane 2,2'-diisocyanate and oligomeric diphenylmethane diisocyanate. In this preferred embodiment, the component (ai) particularly preferably comprises oligomeric diphenylmethane diisocyanate and has a functionality of at least 2.4.

The viscosity of the component (ai) used can vary within a wide range. The component (ai) preferably has a viscosity of from 1 to 300 mPa·s, particularly preferably from 2 to 250 mPa·s.

The components (ai) and (aa) will hereinafter be referred to collectively as organic gel precursor (A'). It will be obvious to a person skilled in the art that the partial reaction of the component (ai) and (aa) leads to the actual gel precursor (A') which is subsequently converted into a gel.

Further Components

The composition (A) can further comprise at least one catalyst as component (ac). The amount of component (ac) used is preferably at least 0.1% by weight, in particular at least 0.2% by weight, particularly preferably at least 0.3% by weight, in particular at least 0.5% by weight. The amount of component (ac) used is preferably at most 20% by weight, in particular at most 18% by weight, particularly preferably at most 16% by weight, in particular at most 14% by weight, in each case based on the total weight of the composition (A).

According to a further embodiment, the composition (A) is free of an additional component which acts as a catalyst, in particular, composition (A) preferably is free of a catalyst which comprises at least one tertiary amino group.

Composition (A) may also comprise further additives such as for example IR absorbers or flame retardants. Suitable additives are known to the person skilled in the art.

Solvent (B)

According to the present invention, the reaction takes place in the presence of a solvent (B).

For the purposes of the present invention, the term solvent (B) comprises liquid diluents, i.e. both solvents in the narrower sense and also dispersion media. The mixture can, in particular, be a true solution, a colloidal solution or a dispersion, e.g. an emulsion or suspension. The mixture is preferably a true solution. The solvent (B) is a compound which is liquid under the conditions of step (a), preferably an organic solvent.

The solvent (B) can in principle be any suitable compound or mixture of a plurality of compounds, with the solvent (B) being liquid under the temperature and pressure conditions under which the mixture is provided in step (a) (dissolution conditions for short). The composition of the solvent (B) is selected so that it is able to dissolve or disperse, preferably dissolve, the organic gel precursor. Preferred solvents (B) are those which are a solvent for the organic gel precursor (A'), i.e. ones which dissolve the organic gel precursor (A') completely under the reaction conditions. The reaction product of the reaction in the presence of the solvent (B) is initially a gel, i.e. a viscoelastic chemical network which is swollen by the solvent (B). A solvent (B) which is a good swelling agent for the network formed in step (b) generally leads to a network having fine pores and a small average pore diameter, while a solvent (B) which is a poor swelling agent for the gel resulting from step (b) generally leads to a coarse-pored network having a large average pore diameter.

The choice of the solvent (B) thus influences the desired pore size distribution and the desired porosity. The choice of the solvent (B) is also generally made in such a way that precipitation or flocculation due to formation of a precipitated reaction product does not occur to a significant extent during or after step (b) of the process of the invention.

When a suitable solvent (B) is chosen, the proportion of precipitated reaction product is usually less than 1% by weight, based on the total weight of the mixture. The amount of precipitated product formed in a particular solvent (B) can be determined gravimetrically by filtering the reaction mixture through a suitable filter before the gelling point.

Possible solvents (B) are solvents known from the prior art for isocyanate-based polymers. Preferred solvents are those which are a solvent for the components (ai) and (aa), i.e. solvents which dissolve the constituents of the components (ai) and (aa) virtually completely under the reaction conditions. The solvent (B) is preferably inert, i.e. unreactive, toward component (ai). Possible solvents (B) are, for example, ketones, aldehydes, alkyl alkanoates, amides such as formamide and N-methylpyrollidone, sulfoxides such as dimethyl sulfoxide, aliphatic and cycloaliphatic halogenated hydrocarbons, halogenated aromatic compounds and fluorine-containing ethers. Mixtures of two or more of the abovementioned compounds are likewise possible. Further possibilities as solvents (B) are acetals, in particular diethoxymethane, dimethoxymethane and 1,3-dioxolane.

Dialkyl ethers and cyclic ethers are likewise suitable as solvent (B). Preferred dialkyl ethers are, in particular, those having from 2 to 6 carbon atoms, in particular methyl ethyl ether, diethyl ether, methyl propyl ether, methyl isopropyl ether, propyl ethyl ether, ethyl isopropyl ether, dipropyl ether, propyl isopropyl ether, diisopropyl ether, methyl butyl ether, methyl isobutyl ether, methyl t-butyl ether, ethyl n-butyl ether, ethyl isobutyl ether and ethyl t-butyl ether. Preferred cyclic ethers are, in particular, tetrahydrofuran, dioxane and tetrahydropyran. Aldehydes and/or ketones are particularly preferred as solvent (B). Aldehydes or ketones suitable as solvent (B) are, in particular, those corresponding to the general formula $R^2$—(CO)—$R^1$, where $R^1$ and $R^2$ are each hydrogen or an alkyl group having 1, 2, 3, 4, 5, 6 or 7 carbon atoms. Suitable aldehydes or ketones are, in particular, acetaldehyde, propionaldehyde, n-butyraldehyde, isobutyraldehyde, 2-ethylbutyraldehyde, valeraldehyde, isopentaldehyde, 2-methylpentaldehyde, 2-ethylhexaldehyde, acrolein, methacrolein, crotonaldehyde, furfural, acrolein dimer, methacrolein dimer, 1,2,3,6-tetrahydrobenzaldehyde, 6-methyl-3-cyclohexenaldehyde, cyanoacetaldehyde, ethyl glyoxylate, benzaldehyde, acetone, diethyl ketone, methyl ethyl ketone, methyl isobutyl ketone, methyl n-butyl ketone, methyl pentylketone, dipropyl ketone, ethyl isopropyl ketone, ethyl butyl ketone, diisobutylketone, 5-methyl-2-acetyl furan, 2-acetylfuran, 2-methoxy-4-methylpentan-2-one, 5-methylheptan-3-one, octanone, cyclohexanone, cyclopentanone, and acetophenone. The abovementioned aldehydes and ketones can also be used in the form of mixtures. Ketones and aldehydes having alkyl groups having up to 3 carbon atoms per substituent are preferred as solvent (B). Further preferred solvents are alkyl alkanoates, in particular methyl formate, methyl acetate, ethyl formate, isopropyl acetate, butyl acetate, ethyl acetate, glycerine triacetate and ethyl acetoacetate. Preferred halogenated solvents are described in WO 00/24799, page 4, line 12 to page 5, line 4. Further suitable solvents (B) are organic carbonates such as for example dimethyl carbonate, ethylene carbonate, propylene carbonate or butylene carbonate. In many cases, particularly suitable solvents (B) are obtained by using two or more completely miscible compounds selected from the abovementioned solvents.

Preferably, dry solvents are used as solvent (B), i.e. solvents which are substantially free of water. In this context, substantially free of water means that the solvent comprises less than 0.5% by weight of water, preferably less than 0.1% by weight of water.

To obtain a sufficiently stable gel which does not shrink too much during drying in step (c) in step (b), the proportion of the composition (A) based on the total weight of the mixture (I) comprising composition (A) and the solvent (B), which is 100% by weight, must generally be not less than 1% by weight. The proportion of the composition (A) based on the total weight of the mixture (I) comprising composition (A) and the solvent (B), which is 100% by weight, is preferably at least 2% by weight, particularly preferably at least 3% by weight, in particular at least 3.5% by weight.

On the other hand, the concentration of the composition (A) in the mixture provided must not be too high since otherwise no porous material having favorable properties is obtained. In general, the proportion of the composition (A) based on the total weight of the mixture (I) comprising composition (A) and the solvent (B), which is 100% by weight, is not more than 50% by weight. The proportion of the composition (A) based on the total weight of the mixture (I) comprising composition (A) and the solvent (B), which is 100% by weight, is preferably not more than 45% by weight, particularly preferably not more than 42% by weight, more preferably not more than 39% by weight, in particular not more than 36% by weight. The total proportion by weight of the composition (A) based on the total weight of the mixture (I) comprising composition (A) and the solvent (B), which is 100% by weight, is preferably from 1 to 45% by weight, in particular from 2 to 42% by weight, more preferably from 3 to 39% by weight, particularly preferably from 3.5 to 36% by weight. Adherence to the amount of the starting materials in the range mentioned leads to porous materials having a particularly advantageous pore structure, low thermal conductivity and low shrinking during drying.

Before the reaction, it is necessary to mix the components used, in particular to mix them homogeneously. The rate of mixing should be high relative to the rate of the reaction in order to avoid mixing defects. Appropriate mixing methods are known per se to those skilled in the art.

According to the present invention, a solvent (B) is used. The solvent (B) can also be a mixture of two or more solvents, for example three or four solvents. Suitable solvents are for example mixtures of two or more ketones, for example mixtures of acetone and diethyl ketone, mixtures of acetone and methyl ethyl ketone or mixtures of diethyl ketone and methyl ethyl ketone.

Further preferred solvents are mixtures of propylene carbonate with one or more solvents, for example mixtures of propylene carbonate and diethyl ketone, or mixtures of propylene carbonate with two or more ketones, for example mixtures of propylene carbonate with acetone and diethyl ketone, mixtures of propylene carbonate with acetone and methyl ethyl ketone or mixtures of propylene carbonate with diethyl ketone and methyl ethyl ketone.

According to the present invention, it is also possible that solvent (B) is replaced by a solvent (S) after the organic gel is obtained. Solvent (S) might for example be any solvent which is miscible with the solvents and liquids used in step c) of the process of the present invention.

Suitable solvents (S) are for example selected from the group consisting of acetone, diethyl ketone, methyl ethyl ketone, methyisobutyl ketone, methyl formate, methyl acetate, ethyl formate, isopropyl acetate, butyl acetate, ethyl acetate, methyl ethyl ether, diethyl ether, methyl propyl ether, methyl isopropyl ether, methanol, ethanol, propanol, and iso-propanol.

According to a further embodiment, the present invention is directed to the process for preparing a porous material as disclosed above, wherein solvent (B) is replaced by a solvent (S) after the organic gel is obtained and before step c). In particular, the present invention is directed to the process for preparing a porous material as disclosed above, wherein solvent (B) is replaced by a solvent (S) after the organic gel is obtained and before step c), wherein the solvent (S) is selected from the group consisting of acetone, diethyl ketone, methyl ethyl ketone, methyisobutyl ketone, methyl formate, methyl acetate, ethyl formate, isopropyl acetate, butyl acetate, ethyl acetate, methyl ethyl ether, diethyl ether, methyl propyl ether, methyl isopropyl ether, methanol, ethanol, propanol, and iso-propanol.

Preferred Process for Producing the Porous Materials

The process of the invention comprises at least the following steps:
(a) provision of the mixture comprising the composition (A) and the solvent (B) as described above,
(b) reaction of the components in composition (A) in the presence of the solvent (B) to form a gel and
(c) drying of the gel obtained in the preceding step.

Preferred embodiments of steps (a) to (c) will be described in detail below.

Step (a)

According to the invention, a mixture comprising composition (A) and the solvent (B) are provided in step (a).

The components of composition (A), for example the components (ai) and (aa) are preferably provided separately from one another, each in a suitable partial amount of the solvent (B). The separate provision makes it possible for the gelling reaction to be optimally monitored or controlled before and during mixing.

The mixture or mixtures provided in step (a) can also comprise customary auxiliaries known to those skilled in the art as further constituents. Mention may be made by way of example of surface-active substances, flame retardants, nucleating agents, oxidation stabilizers, lubricants and mold release agents, dyes and pigments, stabilizers, e.g. against hydrolysis, light, heat or discoloration, inorganic and/or organic fillers, reinforcing materials and biocides. Further information regarding the abovementioned auxiliaries and additives may be found in the specialist literature, e.g. in Plastics Additive Handbook, 5th edition, H. Zweifel, ed. Hanser Publishers, Munich, 2001.

Step (b)

According to the invention, the reaction of the components of composition (A) takes place in the presence of the solvent (B) to form a gel in step (b). To carry out the reaction, a homogeneous mixture of the components provided in step (a) firstly has to be produced. The provision of the components provided in step (a) can be carried out in a conventional way. A stirrer or another mixing device is preferably used here in order to achieve good and rapid mixing. The time required for producing the homogeneous mixture should be short in relation to the time during which the gelling reaction leads to at least partial formation of a gel, in order to avoid mixing defects. The other mixing conditions are generally not critical; for example, mixing can be carried out at from 0 to 100° C. and from 0.1 to 10 bar (absolute), in particular at, for example, room temperature and atmospheric pressure. After a homogeneous mixture has been produced, the mixing apparatus is preferably switched off.

For the purposes of the present invention, a gel is a crosslinked system based on a polymer which is present in contact with a liquid (known as Solvogel or Lyogel, or with water as liquid: aquagel or hydrogel). Here, the polymer phase forms a continuous three-dimensional network.

In step (b) of the process of the invention, the gel is usually formed by allowing to rest, e.g. by simply allowing the container, reaction vessel or reactor in which the mixture is present (hereinafter referred to as gelling apparatus) to stand. The mixture is preferably no longer stirred or mixed during gelling (gel formation) because this could hinder formation of the gel. It has been found to be advantageous to cover the mixture during gelling or to close the gelling apparatus.

Gelling is known per se to a person skilled in the art and is described, for example, in WO 2009/027310 on page 21, line 19 to page 23, line 13.

Step (c)

According to the invention, the gel obtained in the previous step is dried in step (c).

Drying under supercritical conditions is in principle possible, preferably after replacement of the solvent by $CO_2$ or other solvents suitable for the purposes of supercritical drying. Such drying is known per se to a person skilled in the art. Supercritical conditions characterize a temperature and a pressure at which $CO_2$ or any solvent or any mixture of those used for removal of the gelation solvent is present in the supercritical state. In this way, shrinkage of the gel body on removal of the solvent can be reduced.

However, in view of the simple process conditions, preference is given to drying the gels obtained by conversion of the liquid comprised in the gel into the gaseous state at a temperature and a pressure below the critical temperature and the critical pressure of the liquid comprised in the gel. The drying of the gel obtained is preferably carried out by converting the solvent (B) or (S) into the gaseous state at a temperature and a pressure below the critical temperature and the critical pressure of the solvent (B) or (S) respectively. Accordingly, drying is preferably carried out by removing the solvent (B) which was present in the reaction without prior replacement by a further solvent. However, according to the present invention, solvent (B) might also be replaced by a suitable solvent (S). In case solvent (B) is replaced by a solvent (S), drying is carried out by removing the solvent (S).

Such methods are likewise known to those skilled in the art and are described in WO 2009/027310 on page 26, line 22 to page 28, line 36.

According to a further embodiment, the present invention is directed to the process for preparing a porous material as disclosed above, wherein the drying according to step c) is carried out by converting the liquid comprised in the gel into the gaseous state at a temperature and a pressure below the critical temperature and the critical pressure of the liquid comprised in the gel. According to a further embodiment, the present invention is directed to the process for preparing a porous material as disclosed above, wherein the drying according to step c) is carried out under supercritical conditions.

Properties of the Porous Materials and Use

The present invention further provides the porous materials which can be obtained by the process of the invention. Aerogels are preferred as porous materials for the purposes of the present invention, i.e. the porous material which can be obtained according to the invention is preferably an aerogel.

Furthermore, the present invention therefore is directed to a porous material which is obtained or obtainable by the process for preparing a porous material as disclosed above. In particular, the present invention is directed to a porous material which is obtained or obtainable by the process for preparing a porous material as disclosed above, wherein the drying according to step c) is carried out under supercritical conditions.

The average pore diameter is determined by scanning electron microscopy and subsequent image analysis using a statistically significant number of pores. Corresponding methods are known to those skilled in the art.

The volume average pore diameter of the porous material is preferably not more than 400 nano meters. The volume average pore diameter of the porous material is particularly preferably not more than 300 nanometers, very particularly preferably not more than 200 nano meters and in particular not more than 100 nano meters.

Although a very small pore size combined with a high porosity is desirable from the point of view of a low thermal conductivity, from the point of view of production and to obtain a sufficiently mechanically stable porous material, there is a practical lower limit to the volume average pore diameter. In general, the volume average pore diameter is at least 5 nm, preferably at least 10 nm. The porous material which can be obtained according to the invention preferably has a porosity of at least 70% by volume, in particular from 70 to 99% by volume, particularly preferably at least 80% by volume, very particularly preferably at least 85% by volume, in particular from 85 to 95% by volume. The porosity in % by volume means that the specified proportion of the total volume of the porous material comprises pores. Although a very high porosity is usually desirable from the point of view of a minimal thermal conductivity, an upper limit is imposed on the porosity by the mechanical properties and the processability of the porous material.

The components of composition (A), for example the components (ai) and (aa), are present in reactive (polymer) form in the porous material which can be obtained according to the invention. Owing to the composition according to the invention, the monomer building blocks are predominantly bound via urea linkages in the porous material.

The determination of the mol % of the linkages of the monomer building blocks in the porous material is carried out by means of NMR spectroscopy (nuclear magnetic resonance) in the sok id or in the swollen state. Suitable methods of determination are known to those skilled in the art.

The density of the porous material which can be obtained according to the invention is usually from 20 to 900 g/l, preferably from 50 to 800 g/l and particularly preferably from 80 to 7500 g/l.

The process of the invention gives a coherent porous material and not only a polymer powder or particles. Here, the three-dimensional shape of the resulting porous material is determined by the shape of the gel which is in turn determined by the shape of the gelling apparatus. Thus, for example, a cylindrical gelling vessel usually gives an approximately cylindrical gel which can then be dried to give a porous material having a cylindrical shape.

The porous materials which can be obtained according to the invention have a low thermal conductivity, a high porosity and a low density combined with high mechanical stability. In addition, the porous materials have a small average pore size. The combination of the abovementioned properties allows the materials to be used as insulation material in the field of thermal insulation, in particular for applications in the ventilated state as building materials. The porous materials which can be obtained according to the invention have advantageous thermal properties and also further advantageous properties such as simple processability and high mechanical stability, for example low brittleness.

The present invention is also directed to the use of porous materials as disclosed above or a porous material obtained or obtainable according to a process as disclosed above as thermal insulation material or for vacuum insulation panels. The thermal insulation material is for exampie insulation material which is used for insulation in the interior or the exterior of a building. The porous material according to the present invention can advantageously be used in thermal insulation systems such as for example composite materials.

According to a further embodiment, the present invention therefore is directed to the use of porous materials as disclosed above, wherein the porous material is used in interior or exterior thermal insulation systems. According to a further embodiment, the present invention is also directed to the use of porous materials as disclosed above, wherein the porous material is used in water tank or ice maker thermal insulation systems.

As disclosed above, the process according to the present invention is also suitable for producing a porous material which comprises metal particles in the pores. Such porous materials are suitable for the use as catalyst or in a catalyst. Thus, according to a further embodiment, the present invention is also directed to the use of porous materials as disclosed above, wherein the porous material is used as catalyst.

The present invention includes the following embodiments, wherein these include the specific combinations of embodiments as indicated by the respective interdependencies defined therein.

1. Process for preparing a porous material, at least comprising the steps of:
   a) providing a mixture (I) comprising
      (i) a composition (A) at least comprising
         at least one polyfunctional isocyanate as component (ai)
         at least one mineral acid (aa) and
      (ii) a solvent (B),
   b) reacting the components in the composition (A) obtaining an organic gel, and
   c) drying of the gel obtained.
2. The process according to embodiment 1, wherein composition (A) comprises
   amines in an amount in the range of from 0 to 2 wt.-%,
   alcohols in an amount in the range of from 0 to 20 wt.-% and
   water in an amount in the range of from 0 to 1 wt.-%.
3. The process according to embodiment 1 or 2, wherein the polyfunctional isocyanate is selected from the group consisting of aromatic, aliphatic, cycloaliphatic and araliphatic isocyanates.
4. The process according to any of embodiments 1 to 3, wherein composition (A) comprises component (ai) in an amount in the range of from 40 to 99 mol %.
5. The process according to any of embodiments 1 to 4, wherein the mineral acid (aa) is selected from the group consisting of mineral oxo-acids comprising sulphur, boron, nitrogen, phosphorus, silicon, chlorine, bromine, iodine or fluorine, chromium, vanadium, manganese, rhenium, technetium, arsenic, selenium or tellurium.
6. The process according to any of embodiments 1 to 5, wherein composition (A) comprises the mineral acid (aa) in an amount in the range of from 60 to 1 mol %.
7. The process according to any of embodiments 1 to 6, wherein solvent (B) is replaced by a solvent (S) after the organic gel is obtained and before step c).
8. The process according to any of embodiments 1 to 7, wherein the drying according to step c) is carried out by converting the liquid comprised in the gel into the gaseous state at a temperature and a pressure below the critical temperature and the critical pressure of the liquid comprised in the gel.
9. A porous material, which is obtained or obtainable by the process according to any of embodiments 1 to 8.
10. The use of porous materials according to embodiment 9 or a porous material obtained or obtainable by the process according to any of embodiments 1 to 8 as thermal insulation material or for vacuum insulation panels.
11. The use of porous materials according to embodiment 9 or a porous material obtained or obtainable by the process according to any of embodiments 1 to 8 as catalyst.

Examples will be used below to illustrate the invention.

EXAMPLES

1. Materials

Desmodur RE®: Solution of approx. 27% triphenylmethane-4,4',4"-triisocyanate (TIPM) in ethyl acetate having an NCO content of 9.3±0.2% in accordance with M105-ISO 11909 a functionality in the region of three and a viscosity of 3 mPa·s at 20° C. in accordance with DIN 53 015.

2. Methods 2.1 Physical Characterization

Bulk densities ($\rho b$) were calculated from the weight and the physical dimensions of the samples. Skeletal densities ($\rho s$) were determined with helium pycnometry using a Micromeritics AccuPyc II 1340 instrument.

2.2 Structural Characterization

BET surface areas and pore size distributions for pore sizes in the 1.7-300 nm range were determined with $N_2$-sorption porosimetry at 77 K using a Micromeritics ASAP 2020 surface area and porosity analyzer. Micropore analysis was conducted with $CO_2$-sorption up to 760 torr (relative pressure of 0.03) at 0° C. using a Micromeritics Tristar II 3020 version 3.02.

3. Preparation of Porous Materials Using $H_3BO_3$ 3.1 Preferred Procedure for Producing the Porous Materials BPUA-x:

In a typical procedure, $H_3BO_3$ (0.61 g, 0.01 mol) was dissolved in anhydrous DMF and the solution was added to 13.6 g of Desmodur RE (containing 3.67 g, 0.01 mol of TIPM). The resulting sol was stirred at room temperature under $N_2$ for 15 min, and was poured into molds (Wheaton 4 mL Polypropylene Omni-Vials 1.04 cm in inner diameter, Fisher part No. 225402), which were then sealed and left for gelation. The total weight percent concentration of monomers (TIPM+$H_3BO_3$) in the sol was varied by varying the amount of solvent (DMF), and is denoted by extension -x in the sample names. Gelation of BPUA-x took place at room temperature. All formulations and gelation times are summarized in Table 1. Gels were aged for 12 h at room temperature in their molds, removed from the molds, washed with DMF (2×) and acetone (4×, using 4× the volume of the gel for each wash), and were dried in an autoclave with liquid $CO_2$ extracted as a supercritical fluid (SCF).

3.2 Preferred Procedure for Producing the Porous Materials PUA-y:

In a typical procedure, Et3N was added at 0.3% w/w relative to the mass of a solution of 13.6 g of Desmodur RE (containing 3.67 g, 0.01 mol of TIPM), $H_2O$ (0.54 g, 0.03 mol) and anhydrous DMF. The resulting sol was stirred at room temperature under $N_2$ for 10 min, and was poured into molds (Wheaton 4 mL Polypropylene Omni-Vials 1.04 cm in inner diameter, Fisher part No. 225402), which were sealed and left for gelation at room temperature. The total weight percent concentration of monomers (TIPM+$H_2O$) in the sol was varied by varying the amount of solvent (DMF), and is denoted by extension -y in the sample names. All formulations and gelation times are summarized in Table. Gels were aged for 12 h at room temperature in their molds. Subsequently, gels were removed from the molds, washed with DMF (2×), acetone (4×, using 4× the volume of the gel for each wash), and were dried in an autoclave with liquid $CO_2$ extracted as a SCF.

3.3 Drying

Drying of wet-gels with supercritical fluid (SCF) $CO_2$ was carried out in an autoclave (SPIDRY Jumbo Supercritical Point Dryer, SPI Supplies, Inc. West Chester, Pa. or a SpeedSFE system, Applied Separations, Allentown, Pa.). Samples were loaded into the autoclave and acetone was added till all samples were submerged. The pressure vessel was closed and liquid $CO_2$ was allowed in at room temperature until it displaced all acetone, which was drained out. Liquid $CO_2$ was allowed in the vessel several more times until all acetone was extracted out of the pores of the samples. At that point, $CO_2$ started coming out forming dry ice. Subsequently, the temperature of the autoclave was raised to 40° C. and SCF $CO_2$ was vented off as a gas.

TABLE 1

Formulations of BPUA-x aerogels.

| | Boric acid | | | | Desmodur RE [b] | | TIPM | | | DMF | |
|---|---|---|---|---|---|---|---|---|---|---|---|
| Sample | mass (g) | volume [a] (mL) | mmol | C (M) | volume (mL) | mass (g) | mass [c] (g) | mmol | C (M) | mass (g) | volume (mL) |
| BPUA-1 | 0.062 | 0.043 | 1.0 | 0.089 | 1.33 | 1.359 | 0.367 | 1.0 | 0.089 | 9.30 | 9.79 |
| BPUA-2 | 0.062 | 0.043 | 1.0 | 0.181 | 1.33 | 1.359 | 0.367 | 1.0 | 0.181 | 3.94 | 4.14 |
| BPUA-3 | 0.062 | 0.043 | 1.0 | 0.275 | 1.33 | 1.359 | 0.367 | 1.0 | 0.275 | 2.15 | 2.26 |
| BPUA-4 | 0.062 | 0.043 | 1.0 | 0.371 | 1.33 | 1.359 | 0.367 | 1.0 | 0.371 | 1.26 | 1.32 |

[a] The volume of boric acid was calculated based on its density: 1.43 g cm$^{-3}$.
[b] The mass of commercial Desmodur RE was calculated based on its density as measured in our lab (1.022 g cm$^{-3}$).
[c] The mass of TIPM in Desmodur RE was calculated based on the 27% w/w concentration given by the supplier.

TABLE 2

Formulations of PUA-y aerogels.

| | Desmodur RE [a] | | TIPM | | | $H_2O$ [c] | | | DMF | | $Et_3N$ [d] | | |
|---|---|---|---|---|---|---|---|---|---|---|---|---|---|
| Sample | volume (mL) | mass (g) | mass [b] (g) | mmol | C (M) | volume (mL) | mass (g) | mmol | mass (g) | volume (mL) | volume (mL) | mass (g) | w/w (%) |
| PUA-1 | 1.33 | 1.359 | 0.367 | 1.0 | 0.103 | 0.05 | 0.05 | 3.0 | 7.81 | 8.22 | 0.041 | 0.030 | 0.3 |
| PUA-2 | 1.33 | 1.359 | 0.367 | 1.0 | 0.208 | 0.05 | 0.05 | 3.0 | 3.22 | 3.39 | 0.022 | 0.016 | 0.3 |
| PUA-3 | 1.33 | 1.359 | 0.367 | 1.0 | 0.314 | 0.05 | 0.05 | 3.0 | 1.69 | 1.78 | 0.016 | 0.012 | 0.3 |
| PUA-4 | 1.33 | 1.359 | 0.367 | 1.0 | 0.422 | 0.05 | 0.05 | 3.0 | 0.93 | 0.98 | 0.009 | 0.007 | 0.3 |

[a] The mass of commercial Desmodur RE was calculated based its density as measured in our lab (1.022 g cm$^{-3}$).
[b] The mass of TIPM in Desmodur RE was calculated based on the 27% w/w concentration given by the supplier.
[d] The amount of the catalyst ($Et_3N$) was varied so that its concentration remained constant at 0.3% w/w relative to the sol (Desmodur RE + $H_2O$ + DMF).
[c] The amount of $H_2O$ was set at a stoichiometric amount to the NCO groups of TIPM, namely at 3 mol equivalents relative to TIPM.

TABLE 3

Material characteristics of BPUA-x and PUA-y aerogels.

| sample I.D. x or y | linear shrinkage (%) [a,b] | bulk density, $\rho_b$ (g cm$^{-3}$) [a] | skeletal density, $\rho_s$ (g cm$^{-3}$) [c] | specific pore volume (cm$^3$ g$^{-1}$) | | | BET surface area, σ (m$^2$ g$^{-1}$) | average pore diameter (nm) BJH [g] |
|---|---|---|---|---|---|---|---|---|
| | | | | $V_{Total}$ [d] | $V_{1.7-300\_nm}$ [e] | $V_{<7.97\_Å}$ [f] | | |
| BPUA-x | | | | | | | | |
| 1 | 52.34 ± 0.61 | 0.283 ± 0.008 | 1.254 ± 0.001 | 2.74 | 1.97 | 0.047 | 367 | 42(21) |
| 2 | 50.13 ± 0.20 | 0.467 ± 0.004 | 1.249 ± 0.002 | 1.34 | 1.27 | 0.033 | 398 | 34(16) |
| 3 | 47.19 ± 0.03 | 0.545 ± 0.004 | 1.242 ± 0.002 | 1.03 | 0.74 | 0.036 | 340 | 14(10) |
| 4 | 41.54 ± 0.14 | 0.576 ± 0.005 | 1.251 ± 0.002 | 0.93 | 0.78 | 0.035 | 317 | 17(9) |
| PUA-y | | | | | | | | |
| 1 | 54.10 ± 1.00 | 0.393 ± 0.033 | 1.231 ± 0.005 | 1.73 | 1.35 | 0.024 | 278 | 27(17) |
| 2 | 48.96 ± 0.40 | 0.600 ± 0.018 | 1.252 ± 0.001 | 0.86 | 0.68 | 0.039 | 291 | 11(14) |
| 3 | 40.45 ± 0.48 | 0.557 ± 0.027 | 1.253 ± 0.001 | 0.99 | 0.76 | 0.029 | 327 | 10(13) |
| 4 | 30.76 ± 0.41 | 0.428 ± 0.003 | 1.233 ± 0.003 | 1.52 | 1.02 | 0.034 | 353 | 16(12) |

[a] Average of 3 samples.
[b] Linear shrinkage = 100×(mold diameter − sample diameter)/(mold diameter).
[c] Single sample, average of 50 measurements.
[d] Calculated via VTotal = (1/ρb) − (1/ρs).
[e] Cumulative volume of pores between 1.7 nm and 300 nm from N2-sorption data and the BJH desorption method.
[f] Total pore volume of pores less than 7.97 Å from CO2 sorption data at 273K using the single-point absorption method at P/Po = 0.03.
[g] From the BJH plots: first numbers are peak maxima; numbers in (parentheses) are full widths at half maxima.

TABLE 4

Formulations of other Acid-PUA aerogels.

| Mineral acid used | Mineral acid mass (g) | Mineral acid volume[a] (mL) | mmol | C (M) | Desmodur RE[b] volume (mL) | mass (g) | TIPM mass[c] (g) | mmol | C (M) | Solvent[d] mass (g) | volume (mL) |
|---|---|---|---|---|---|---|---|---|---|---|---|
| $H_3PO_4$ | 0.098 | 0.051 | 1.00 | 0.371 | 1.33 | 1.359 | 0.367 | 1.00 | 0.371 | 1.45 | 1.31 |
| $H_3PO_3$ | 0.123 | 0.074 | 1.50 | 0.529 | 1.33 | 1.359 | 0.367 | 1.00 | 0.352 | 1.58 | 1.43 |
| $H_2SeO_3$ | 0.193 | 0.064 | 1.50 | 0.436 | 1.33 | 1.359 | 0.367 | 1.00 | 0.290 | 1.94 | 2.05 |
| $Te(OH)_6$ | 0.114 | 0.037 | 0.50 | 0.168 | 1.33 | 1.359 | 0.367 | 1.00 | 0.336 | 1.53 | 1.61 |
| $H_5IO_6$ | 0.136 | 0.097 | 0.60 | 0.190 | 1.33 | 1.359 | 0.367 | 1.00 | 0.316 | 1.64 | 1.73 |
| $H_3AuO_3$ | 0.248 | 0.023 | 1.00 | 0.079 | 1.33 | 1.359 | 0.367 | 1.00 | 0.079 | 10.69 | 11.25 |

[a] The volume of boric acid was calculated based on its density: 1.43 g $cm^{-3}$.
[b] The mass of commercial Desmodur RE was calculated based on its density as measured in our lab (1.022 g $cm^{-3}$).
[c] The mass of TIPM in Desmodur RE was calculated based on the 27% w/w concentration given by the supplier.

4. Preparation of Porous Materials Using Other Mineral Acids

4.1 General Procedure

Phosphoric acid (pure), was purchased from Acros Organics, phosphorous acid (98%) was purchased from Alfa Aesar, telluric acid (≥99%), selenous acid (98%), periodic acid (≥99%) and auric acid were purchased from Sigma-Aldrich. All sols were formulated so that the weight percent of monomers (TIPM+mineral acid) was kept constant at 16%. All formulations and gelation times are summarized in Table S.9. Materials characterization data are provided in Table S.10. Specifically:

4.2 Gelation of TIPM and $H_3PO_4$:

$H_3PO_4$ (0.98 g, 0.010 mol) was dissolved in anhydrous DMSO (13.1 mL, 14.5 g) and the solution was cooled in a dry ice/acetone bath (−78° C.). As that solution thawed, it was added to cold (−78° C.) 13.6 g of Desmodur RE (containing 3.67 g, 0.01 mol of TIPM) and the mixture was stirred vigorously.

4.3 Gelation of TIPM and $H_3PO_3$:

$H_3PO_3$ (1.23 g, 0.015 mol) was dissolved in anhydrous DMSO (14.3 mL, 15.8 g) and the solution was cooled in a dry ice/acetone bath (−78° C.). As that solution thawed, it was added to cold (−78° C.) 13.6 g of Desmodur RE (containing 3.67 g, 0.01 mol of TIPM) and the mixture was stirred vigorously.

4.4 Gelation of TIPM and $H_2SeO_3$:

$H_2SeO_3$ (1.93 g, 0.015 mol) was dissolved in anhydrous DMF (20.5 mL, 19.4 g), and the solution was cooled in a dry ice/acetone bath (−78° C.). The cold solution was added to cold (−78° C.) 13.6 g of Desmodur RE (containing 3.67 g, 0.01 mol of TIPM) and the mixture was stirred vigorously.

4.5 Gelation of TIPM and $Te(OH)_8$:

$Te(OH)_6$ (1.14 g, 0.005 mol) was dissolved in anhydrous DMF (16.1 mL, 15.3 g), the solution was added at room temperature to 13.6 g of Desmodur RE (containing 3.67 g, 0.01 mol of TIPM) and the mixture was stirred vigorously.

4.6 Gelation of TIPM and $H_5IO_5$:

$H_5IO_6$ (1.36 g, 0.006 mol) was dissolved in anhydrous DMF (17.3 mL, 16.4 g), and the solution was added at room temperature to 13.6 g of Desmodur RE (containing 3.67 g, 0.01 mol of TIPM) and the mixture was stirred vigorously.

4.7 Gelation of TIPM and $H_3AuO_3$:

$H_3AuO_3$ (2.48 g, 0.01 mol) was dissolved in anhydrous DMF (112.5 mL, 106.9 g), and the solution was added at room temperature to 13.6 g of Desmodur RE (containing 3.67 g, 0.01 mol of TIPM) and the mixture was stirred vigorously.

The resulting sols were poured in molds and were left at room temperature to gel, except the $H_3AuO_3$ sols, which were placed in an oven at 90° C. After aging (12 h at room temperature, except the $H_3AuO_3$ gels, which were aged at 90° C.) gels were removed from the molds, were washed with DMF (2×), acetone (4×, using 4× the volume of the gel for each wash) and were dried in an autoclave with liquid $CO_2$ taken out at the end as a supercritical fluid (SCF).

TABLE 5

Material characteristics of other Acid-PUA aerogels

| Mineral acid used | linear shrinkage (%)[a,b] | bulk density, $\rho_b$ (g $cm^{-3}$)[a] | skeletal density, $\rho_s$ (g $cm^{-3}$)[c] | specific pore volume ($cm^3$ $g^{-1}$) $V_{Total}$[e] | $V_{1.7-300\ nm}$[f] | $V_{Total}/V_{1.7-300\ nm}$ | BET surf. area, σ ($m^2$ $g^{-1}$) | av. pore diameter, (nm) BJH[h] |
|---|---|---|---|---|---|---|---|---|
| $H_3PO_4$ | 30.3 ± 0.2 | 0.41 ± 0.03 | 1.40 ± 0.01 | 1.71 | 1.29 | 1.32 | 218 | 27.5 |
| $H_3PO_3$ | 39.1 ± 0.5 | 0.55 ± 0.01 | 1.40 ± 0.01 | 1.11 | 0.92 | 1.21 | 298 | 13.3 |
| $H_2SeO_3$ | 39.7 ± 0.5 | 0.21 ± 0.03 | 1.85 ± 0.06 | 4.33 | 0.04 | 108 | 17 | 11.1 |
| $Te(OH)_6$ | 44.7 ± 0.4 | 0.63 ± 0.03 | 1.83 ± 0.06 | 1.03 | 0.78 | 1.32 | 335 | 12.3 |
| $H_5IO_6$ | 45.2 ± 0.8 | 0.78 ± 0.03 | 1.60 ± 0.01 | 0.65 | 0.60 | 1.08 | 330 | 7.44 |
| $H_3AuO_3$ | 55.4 ± 0.6 | 0.32 ± 0.04 | 2.38 ± 0.05 | 2.695 | 0.571 | 4.71 | 177 | 7.4 |

[a] Average of 3 samples.
[b] Linear shrinkage = 100×(mold diameter − sample diameter)/(mold diameter).
[c] Single sample, average of 50 measurements.
[d] Calculated via VTotal = (1/ρb)-(1/ρs).
[e] Cumulative volume of pores between 1.7 nm and 300 nm from N2-sorption data and the BJH desorption method.
[f] Total pore volume of pores less than 7.97 Å from CO2 sorption data at 273K using the single-point absorption method at P/Po = 0.03.
[g] From the BJH plots: first numbers are peak maxima; numbers in (parentheses) are full widths at half maxima.

The invention claimed is:

1. A process for preparing a porous material, comprising:
   a) providing a mixture (I) comprising
      (i) a composition (A) comprising
         at least one polyfunctional isocyanate as component (ai), and
         at least one mineral acid (aa) and
      (ii) a solvent (B),
   b) reacting the components in the composition (A) to obtain an organic gel, and
   c) drying the obtained gel,
      wherein the mineral acid (aa) is selected from the group consisting of mineral oxo-acids comprising sulphur, boron, nitrogen, phosphorus, silicon, chlorine, bromine, iodine, fluorine, chromium, vanadium, manganese, rhenium, technetium, arsenic, selenium and tellurium.

2. The process according to claim 1, wherein the composition (A) comprises
   amines in an amount in a range of from 0 to 2 wt. %,
   alcohols in an amount in a range of from 0 to 20 wt. %, and
   water in an amount in a range of from 0 to 1 wt. %.

3. The process according to claim 1, wherein the polyfunctional isocyanate is selected from the group consisting of aromatic, aliphatic, cycloaliphatic and araliphatic isocyanates.

4. The process according to claim 1, wherein the composition (A) comprises the component (ai) in an amount in a range from 40 to 99 mol %.

5. The process according to claim 1, wherein the composition (A) comprises the mineral acid (aa) in an amount in a range of from 60 to 1 mol %.

6. The process according to claim 1, wherein the solvent (B) is replaced by a solvent (S) after the organic gel is obtained and before drying of the gel in c).

7. The process according to claim 1, wherein the drying in c) comprises converting a liquid in the gel into a gaseous state at a temperature and a pressure below a critical temperature and a critical pressure of the liquid in the gel.

8. A porous material, which is obtained by the process according to claim 1.

9. A thermal insulation material comprising the porous material of claim 8.

10. The porous materials according to claim 8, wherein the porous material is a catalyst.

* * * * *